United States Patent
Uh et al.

(10) Patent No.: US 9,757,996 B2
(45) Date of Patent: Sep. 12, 2017

(54) TIRE PRESSURE MONITORING SYSTEM AND METHOD

(71) Applicant: Seetron Inc., Bucheon-Si (KR)

(72) Inventors: Sung Sun Uh, Goyang (KR); Byoum Youn Cho, Bucheon-Si (KR); Nanjapla Naveen, Bucheon-Si (KR); Jae Sung So, Bucheon-Si (KR)

(73) Assignee: Seetron Inc., Bucheon-Si (KR)

( * ) Notice: Subject to any disclaimer, the term of this patent is extended or adjusted under 35 U.S.C. 154(b) by 0 days.

(21) Appl. No.: 14/822,156

(22) Filed: Aug. 10, 2015

(65) Prior Publication Data

US 2016/0221403 A1 Aug. 4, 2016

(30) Foreign Application Priority Data

Sep. 12, 2014 (KR) .................. 10-2014-0120828
Jul. 2, 2015 (KR) .................. 10-2015-0094902

(51) Int. Cl.
*B60C 23/04* (2006.01)
*B60C 23/00* (2006.01)

(52) U.S. Cl.
CPC ........ *B60C 23/0483* (2013.01); *B60C 23/009* (2013.01)

(58) Field of Classification Search
CPC ............ B60C 23/0433; B60C 23/0483; B60C 23/009
USPC ........... 340/431, 291, 539.6, 539.17–539.19, 340/539.21–539.22
See application file for complete search history.

(56) References Cited

U.S. PATENT DOCUMENTS

| | | | | |
|---|---|---|---|---|
| 2002/0130771 A1* | 9/2002 | Osborne | ............... | B60C 23/005 340/438 |
| 2005/0255818 A1* | 11/2005 | Watabe | .................. | H01Q 1/243 455/193.1 |
| 2007/0069877 A1* | 3/2007 | Fogelstrom | ........... | B60C 23/005 340/442 |
| 2008/0001729 A1* | 1/2008 | Kyllmann | ............. | B60C 23/009 340/445 |
| 2008/0042817 A1* | 2/2008 | Fogelstrom | ........... | B60C 23/009 340/442 |
| 2009/0179747 A1* | 7/2009 | Lin | ..................... | B60C 23/0416 340/442 |
| 2009/0195373 A1* | 8/2009 | Lettieri | ................. | B60C 23/007 340/447 |
| 2010/0009643 A1* | 1/2010 | Haartsen | ........... | H04W 52/0251 455/127.5 |

(Continued)

FOREIGN PATENT DOCUMENTS

JP 2005102206 A 4/2005
JP 4232760 B2 3/2009

(Continued)

*Primary Examiner* — George Bugg
*Assistant Examiner* — Thang Tran
(74) *Attorney, Agent, or Firm* — Dinsmore & Shohl LLP

(57) ABSTRACT

A tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers. A first RF transceiving unit transceives data with the first repeater by a low power RF transmitting unit to the plurality of second repeaters.

14 Claims, 8 Drawing Sheets

(56) References Cited

U.S. PATENT DOCUMENTS

2015/0165834 A1\* 6/2015 Laifenfeld .......... B60C 23/0437
340/442

FOREIGN PATENT DOCUMENTS

| KR | 100624037 B1 | 9/2006 |
| KR | 10-0911585 B1 | 8/2009 |

\* cited by examiner

TIRE PRESSURE MONITORING SYSTEM AND METHOD

CROSS-REFERENCE TO RELATED APPLICATIONS

This application claims priority to and the benefit of Korean Patent Application No. 10-2014-0120828 and 10-2015-0094902 filed in the Korean Intellectual Property Office on Sep. 12, 2014 and Jul. 2, 2015, the entire contents of which are incorporated herein by reference.

BACKGROUND OF THE INVENTION

I. Field of the Invention

The present invention relates to a tire pressure monitoring system and method.

II. Description of the Related Art

A tire pressure monitoring system (TPMS) is a system that senses a pressure and temperature of a tire of a vehicle which is being driven by using a sensor attached to the tire, and provides sensed data to a driver.

When air pressure of the tire is more than a reference value, there is a high risk of rolling the vehicle, and when the air pressure is less than the reference value, fuel consumption increases and fuel efficiency deteriorates. Further, when the air pressure of the tire decreases, brake performance deteriorates, and the necessity of the tire pressure monitoring system increases because there are many cases of traffic accidents which occur due to a tire problem, such as a traffic accident caused when puncture occurs, or the like. As a result, the tire pressure monitoring system has been mandatory with respect to cars which have been sold domestically since 2015.

In the related art, the tire pressure monitoring system includes a sensor sensing a temperature and pressure in the tire, a transmitting apparatus wirelessly transmitting the data sensed through the sensor, a receiving apparatus receiving the data transmitted from the transmitting apparatus, and a display apparatus outputting the received data. Further, the tire pressure monitoring system includes a low frequency (LF) wake-up signal generating apparatus registering a position of a replacement tire in a receiver when the tire of the vehicle is replaced.

According to the tire pressure monitoring system in the related art, when a driver replaces the tire, a position of the replacement tire is registered in the receiver by using the low frequency (LF) wake-up signal generating apparatus to allow the driver to determine the position of the replacement tire. However, according to the apparatus, the receiving apparatus and the display apparatus, and the low frequency (LF) wake-up signal generating apparatus, are configured as separate apparatuses, respectively, and as a result, when the driver replaces the tire of the vehicle and registers the position of the replacement tire, at least two operators are required. That is, the tire can be replaced only through cooperation of an operator that provides a signal to the tire transmitting apparatus by using the low frequency (LF) wake-up signal generating apparatus and an operator that verifies whether the signal is normally provided through the display apparatus in the vehicle. Further, in the case of commercial vehicles (a truck, a tractor, a trailer, and the like) having more tires than general vehicles, since two operators need to newly register the position of the tire by using the low frequency (LF) wake-up signal generating apparatus whenever the tire is replaced or added, registering the position of the tire is cumbersome and a lot of time is required in registering the position of the tire.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a tire pressure monitoring system and a tire pressure alarm method which can automatically register the position of a tire in a monitoring apparatus installation in a commercial vehicle or manually register the position of the tire through operator's carrying the tire pressure monitoring system.

The present invention has also been made in an effort to provide a tire pressure monitoring system and a tire pressure alarm method which can rapidly and accurately register the position of a tire when a tire of a tractor or a trailer is replaced or added in a monitoring apparatus.

Exemplary embodiments of the present invention may be used to achieve other objects which are not mentioned in detail in addition to the objects.

An exemplary embodiment of the present invention provides a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, wherein the monitoring unit includes a first RF transceiving unit transceiving data with the first repeater, the plurality of second repeaters, or the plurality of sensors through a radio frequency band, a low power RF transmitting unit transmitting data to the plurality of second repeaters through a low power radio frequency band, an LF transmitting unit transmitting data to the plurality of second repeaters through a low frequency band, a first control unit sensing abnormal data receiving in the first RF transceiving unit, and a display unit outputting connection information for the second repeater received through the first RF transceiving unit.

The first repeater may include a second RF transceiving unit transceiving data with the monitoring unit, the plurality of second repeaters, or the plurality of sensors through the radio frequency band, a first LF receiving unit receiving the data transmitted through the low frequency band, and a second control unit sensing whether the second RF transceiving unit or the LF receiving unit abnormally receives the data and determining whether the tires mounted on the tractor are abnormal.

The plurality of second repeaters may include a third RF transceiving unit transceiving data with the monitoring unit, the first repeater, or the plurality of sensors through the radio frequency band, a second LF receiving unit receiving the data transmitted through the low frequency band, and a third control unit determining whether the tires of the trailer are abnormal.

The first RF transceiving unit may transmit an auto coupling request to the first repeater based on a coupling command input from a user, the second RF transceiving unit may receive the auto coupling request transmitted from the first RF transceiving unit and transmit the auto coupling request to the plurality of second repeaters, and the third RF transceiving unit may receive the auto coupling request transmitted from the second RF transceiving unit and transmit a repeater ID to the first repeater.

When the repeater ID is received through the second RF transceiving unit, a destination ID change request may be transmitted to a second repeater corresponding to the received repeater ID among the plurality of second repeaters.

The low power RF transmitting unit or the LF transmitting unit may transmit a repeater ID request to the plurality of second repeaters, and the third RF transceiving unit may receive the repeater ID request to measure a first received signal strength indicator (RSSI) value and transmit the repeater ID and the measured first RSSI value to the monitoring unit.

The monitoring unit may further include an RSSI measuring unit measuring second RSSI values of the plurality of second repeaters, and when the plurality of repeater IDs are received, a destination ID change request may be transmitted to a second repeater having the maximum first RSSI value or a second repeater having the maximum second RSSI value.

The monitoring unit may further include an RSSI measuring unit measuring the second RSSI values of the plurality of second repeaters, and when the plurality of repeater IDs are received, in the case where the second repeaters having a maximum value of the first RSSI values and the second repeater having the maximum value of the second RSSI values coincide with each other, the destination ID change request may be transmitted to the corresponding second repeater.

The monitoring unit may be portable separately from the tractor.

Another exemplary embodiment of the present invention provides a tire pressure alarm method in a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, including: receiving an auto coupling request transmitted from the monitoring unit and transmitting the auto coupling request to the plurality of second repeaters through a radio frequency band; receiving a repeater ID corresponding to the auto coupling request from the plurality of second repeaters; transmitting a destination ID change request to a second repeater corresponding to the received repeater ID among the plurality of second repeaters; and receiving destination ID change information corresponding to the destination ID change request from one second repeater and transmitting an auto coupling success message to the monitoring unit.

Yet another exemplary embodiment of the present invention provides a tire pressure alarm method in a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, including: transmitting a repeater ID request to the plurality of second repeaters through a low power radio frequency band; receiving the repeater ID from the plurality of second repeaters; transmitting a destination ID change request to a second repeater corresponding to the received repeater ID among the plurality of second repeaters; and receiving destination ID change information corresponding to the destination ID change request from one second repeater and transmitting a success message to the monitoring unit.

When the number of the received repeater IDs is plural, in the transmitting of the destination ID change request, the destination ID change request may be transmitted to a second repeater having the maximum first RSSI value measured through the plurality of second repeaters or a second repeater having the maximum second RSSI value measured through the monitoring unit.

When the number of the received repeater IDs is plural, in the transmitting of the destination ID change request, in the case where the second repeater having the maximum value of the first RSSI values measured through the plurality of second repeaters and the second repeater having the maximum value of the second RSSI values measured through the monitoring unit coincide with each other, the destination ID change request may be transmitted to the corresponding second repeater.

Still another exemplary embodiment of the present invention provides a tire pressure alarm method in a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, including: transmitting a repeater ID request to the plurality of second repeaters through a low power radio frequency band or a low frequency band; receiving the repeater ID from the plurality of second repeaters; and transmitting configured data to a second repeater corresponding to the received repeater ID among the plurality of second repeaters through the radio frequency band.

When the number of the received repeater IDs is plural, in the transmitting of the configured data, the configured data may be transmitted to a second repeater having the maximum first RSSI value measured through the plurality of second repeaters or a second repeater having the maximum second RSSI value measured through the monitoring unit.

When the number of the received repeater IDs is plural, in the transmitting of the configured data, in the case where the second repeater having the maximum value of the first RSSI values measured through the plurality of second repeaters and the second repeater having the maximum value of the second RSSI values measured through the monitoring unit coincide with each other, the configured data may be transmitted to the corresponding second repeater.

The configured data may include at least one of the tractor type, the trailer type, the first repeater or second repeater type, a prescribed air pressure, a prescribed temperature, an alarm level, and a management target sensor ID.

According to one exemplary embodiment of the present invention, when a tire of a commercial vehicle is replaced or added, the position of the tire can be automatically or manually registered. Further, even when a trailer is connected to a tractor, an operator can simply register the position of a trailer tire a short time.

DETAILED DESCRIPTION OF THE PREFERRED EMBODIMENTS

Figure 1:
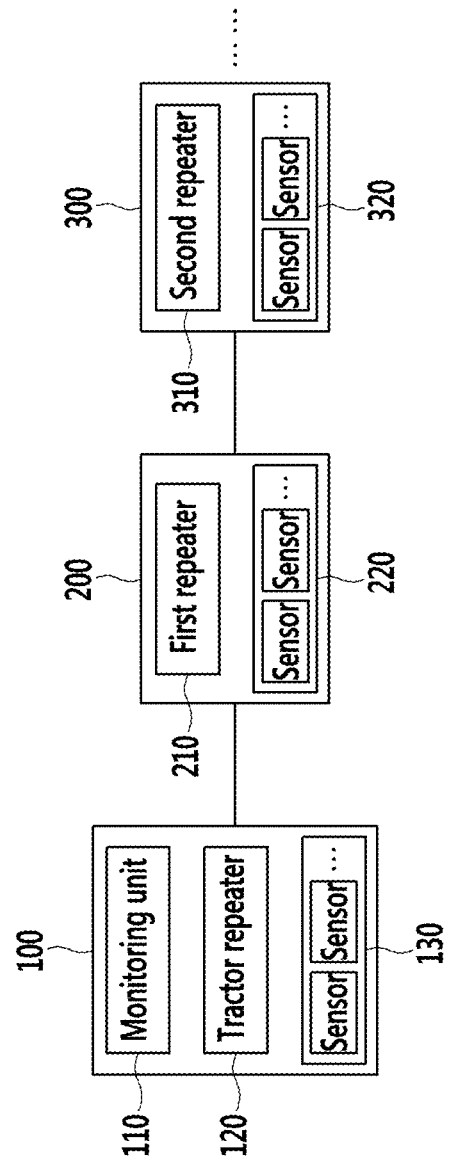
FIG. 1 is a conceptual diagram illustrating a tire pressure monitoring system according to an exemplary embodiment of the present invention.

Hereinafter, exemplary embodiments of the present invention will be described in detail with reference to the accompanying drawings, so as to be easily implemented by those skilled in the art. As those skilled in the art would realize, the described embodiments may be modified in various different ways, all without departing from the spirit or scope of the present invention. Parts which are not related with the description are omitted in the drawings in order to clearly describe the present invention, and like reference numerals designate like elements throughout the specification. Further, a detailed description of related art which is widely known will be omitted.

In the specification, unless explicitly described to the contrary, the word "comprise" and variations such as "comprises" or "comprising" will be understood to imply the inclusion of stated elements but not the exclusion of any other elements.

In the specification, a 'tractor' means a vehicle which has a motor and a driver's seat installed in a vehicle body and can tow vehicles in connection with the towed vehicles (a trailer, a construction machine, an agricultural machine, and the like).

In the specification, a 'trailer' means a vehicle which has no motor installed in the vehicle body to move by a towing truck (tractor), and transports a heavy article or a large-volume article.

FIG. 1 is a conceptual diagram illustrating a tire pressure monitoring system according to an exemplary embodiment of the present invention.

Referring to FIG. 1, a first trailer 200 and a second trailer 300 are connected to a tractor 100. The tractor 100 includes a monitoring unit 110, a repeater 120 (hereinafter, referred to as a 'tractor repeater'), and a first sensor unit 130. The first trailer 200 includes a repeater 210 (hereinafter, referred to as a 'first repeater') and a second sensor unit 220, and the second trailer 300 includes a repeater 310 (hereinafter, referred to as a 'second repeater') and a third sensor unit 320.

The monitoring unit 110 may be mounted on a dashboard of the tractor 100 or may be separately portable, and performs wireless communication with the tractor repeater 120, the first repeater 210, the second repeater 310, the first sensor unit 130, the second sensor unit 220, and the third sensor unit 320.

The tractor repeater 120, the first repeater 210, and the third repeater 310 operate as one of a main repeater, a sub-repeater, and a slave repeater having a wired communication (e.g., RS232 communication) function based on data transmitted from the monitoring unit 110. Further, sensed data transmitted from the first sensor unit 130, the second sensor unit 220, and the third sensor unit 230 are received, analyzed, and transmitted to the monitoring unit 110.

The first sensor unit 130, the second sensor unit 220, and the third sensor unit 230 include sensors positioned in tires of one or more of the tractor 100, the first trailer 200, and the second trailer 300, respectively. The pressure and temperature of a tire are sensed through the sensors, and the sensed data are transmitted to the monitoring unit 110 or the repeaters 120, 210, and 310.

Figure 2:
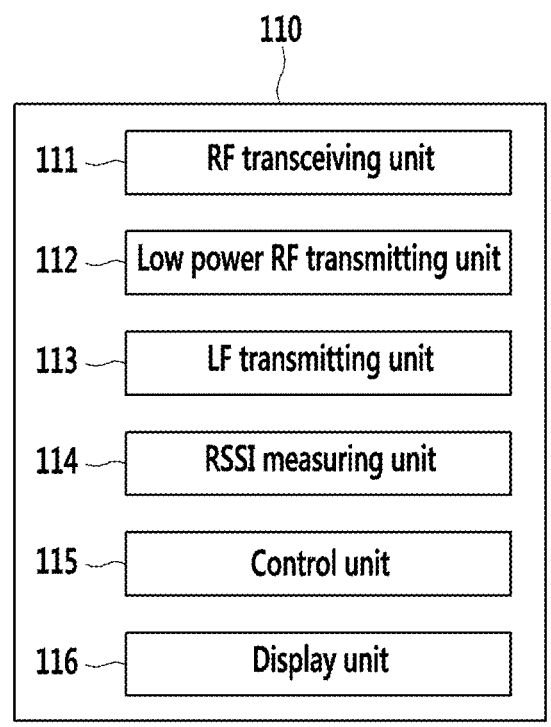
FIG. 2 illustrates a monitoring unit according to an exemplary embodiment of the present invention.

FIG. 2 illustrates a monitoring unit according to an exemplary embodiment of the present invention.

The monitoring unit 110 of FIG. 2 includes a radio frequency (RF) transceiving unit 111, a low power RF transmitting unit 112, a low frequency (LF) transmitting unit 113, a received signal strength indicator (RSSI) measuring unit 114, a control unit 115, and a display unit 116.

The RF transceiving unit 111 transmits data to the tractor repeater 120, the first repeater 210, the second repeater 310, or the sensor units 130, 220, and 320 through a radio frequency band, or receives data transmitted from the tractor repeater 120, the first repeater 210, the second repeater 310, or the sensor units 130, 220, and 320. In this case, a radio frequency may be a high power radio frequency. For example, the RF transceiving unit 111 may transmit an auto coupling request to the tractor repeater 120 or transmit configured data to the first repeater 210 or the second repeater 310, and receive a sensor identification (ID) or sensed data (pressure sensed data or temperature sensed data of the tire) transmitted from the sensor units 130, 220, and 320. Further, the RF transceiving unit 111 receives the data transmitted from the tractor repeater 120, the first repeater 210, the second repeater 310, or the sensor units 130, 220, and 320 and determines the received data according to a predetermined criterion or calculates the number of repeater identifications among the received data.

The low power RF transmitting unit 112 transmits data to the first repeater 210 or the second repeater 310 through a low power radio frequency band. For example, the low power RF transmitting unit 112 may transmit an identification (ID) request to the first repeater 210 or the second repeater 310.

The LF transmitting unit 113 transmits data to the first repeater 210 or the second repeater 310 through a low frequency band. For example, the LF transmitting unit 113 may transmit the identification (ID) request to the first repeater 210 or the second repeater 310.

The RSSI measuring unit 114 measures a received signal strength indicator (RSSI) of a signal received from the tractor repeater 120, the first repeater 210, or the second repeater 310.

The control unit 115 controls an operation of each component of the monitoring unit 110. In detail, when the control unit 115 is connected with the tractor repeater 120, the first repeater 210, or the second repeater 310 by wireless communication, the control unit 115 transmits the configured data through the RF transceiving unit 111. Further, when the data is not received through the RF transceiving unit 111 for a predetermined time while the tractor 100 is being driven, the control unit 115 determines that a problem occurs in a data transceiving function of the monitoring unit 110. In this case, whether the tractor 100 is driven is determined according to a result of sensing a motion of the tractor through a motion sensor or a global positioning system (GPS) mounted on the tractor. Further, a measurement value of the RSSI measuring unit 114 and RSSI values transmitted from the plurality of repeaters are compared to search a repeater having the maximum RSSI value. Further, when the RSSI measuring unit 114 is connected with a control center of a remote place through a long distance wireless communication network, the RSSI measuring unit 114 receives data transmitted from the control center and controls each component of the monitoring unit 110 so as to execute the corresponding function.

The display unit 116 outputs at least one of a data transceiving result of the RF transceiving unit 111, the low power RF transmitting unit 112, or the LF transmitting unit 113, whether the repeaters 120, 210, and 310 are connected, and a power supply state. Further, the display unit 116 further includes a user interface unit (not illustrated in FIG. 2), and receives an auto coupling command with the tractor repeater 120 from a user (a driver or a tire replacement operator) through the user interface unit. The display unit 116 may be implemented by a navigation system or a smart phone.

The monitoring unit 110 further includes a power supply unit (not illustrated in FIG. 2), and the power supply unit supplies power to each component of the monitoring unit 110 by using an internal power supply of the tractor 100 or a cigar jack.

Figure 3:
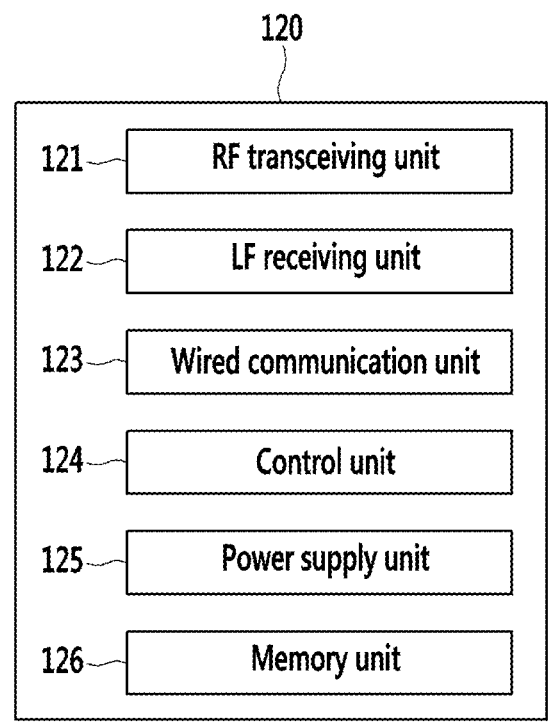
FIG. 3 illustrates a tractor repeater according to an exemplary embodiment of the present invention.

FIG. 3 illustrates a tractor repeater according to an exemplary embodiment of the present invention.

The tractor repeater 120 of FIG. 3 includes an RF transceiving unit 121, an LF receiving unit 122, a wired communication unit 123, a control unit 124, a power supply unit 125, and a memory unit 126. In this case, the memory unit 126 stores a destination ID secured by the monitoring unit 110 and sensor IDs corresponding to the positions of the respective tires mounted on the tractor.

The RF transceiving unit 121 transmits data to the monitoring unit 110, the first repeater 210, the second repeater 310, or the sensor units 130, 220, and 320 through the radio frequency band, or receives the data transmitted from the monitoring unit 110, the first repeater 210, the second repeater 310, or the sensor units 130, 220, and 320.

The LF receiving unit 122 receives the data transmitted from the monitoring unit 110 through the low frequency band.

The wired communication unit 123 performs wired communication with the monitoring unit 110 or the sensor units 130, 220, and 320. In detail, when transceiving data is impossible by using the radio frequency band, the wired communication unit 123 performs the wired communication. For example, the wired communication unit 123 may perform RS-232 or CAN communication.

The control unit 124 controls an operation of each component of the tractor repeater 120 based on the data received through the RF transceiving unit 121 or the LF receiving unit 122. In detail, when the data is not received through the RF transceiving unit 121 or the LF receiving unit 122 for a predetermined time while the tractor 100 is being driven, the control unit 124 determines that a problem occurs in a data transceiving function of the tractor repeater 120.

In this case, whether the tractor 100 is driven is determined according to the result of sensing the motion of the tractor through the motion sensor or the global positioning system (GPS) mounted on the tractor. Further, whether the tire mounted on the tractor 100 is abnormal is determined based on a result of comparing the sensed data transmitted from the first sensor unit 130 and prestored data (reference value), and a message regarding a low-pressure alarm or a high-pressure alarm is transmitted to the monitoring unit 110 according to a determination result.

The power supply unit 125 receives power through a tail lamp power line of the tractor 100 to supply the power to each component of the tractor repeater 120. Further, the power supply unit 125 includes a battery and charges the battery through the tail lamp power line, and supplies the power to each component of the tractor repeater 120 through battery power when supply of the power stops. When a battery charge amount is less than a predetermined reference value, an alarm message (the tail lamp is on) is transferred to the monitoring unit 110.

Figure 4:
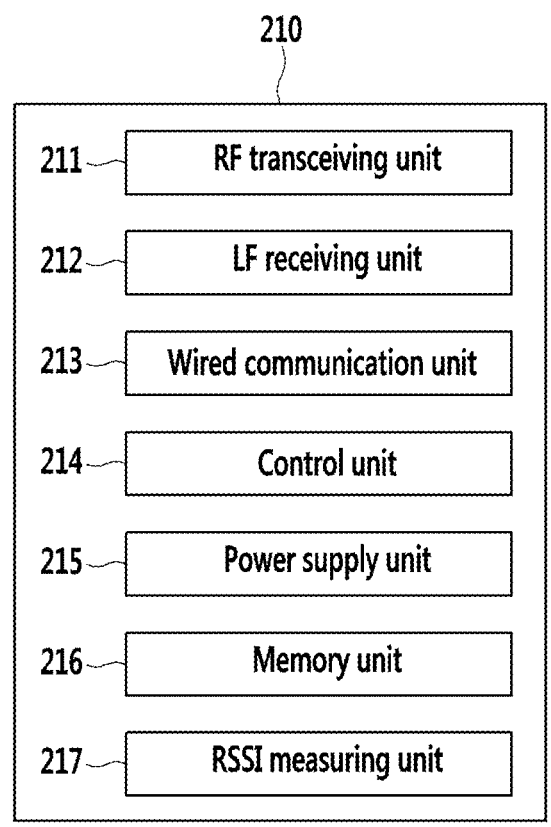
FIG. 4 illustrates a first repeater according to an exemplary embodiment of the present invention.

FIG. 4 illustrates a first repeater according to an exemplary embodiment of the present invention.

The first repeater 210 of FIG. 4 includes an RF transceiving unit 211, an LF receiving unit 212, a wired communication unit 213, a control unit 214, a power supply unit 215, a memory unit 216, and an RSSI measuring unit 217. In this case, since the RF transceiving unit 211, the LF receiving unit 212, the wired communication unit 213, and the power supply unit 215 are the same configurations as the RF transceiving unit 121, the LF receiving unit 122, the wired communication unit 123, and the power supply 125 of the tractor repeater 120 of FIG. 3, a duplicated description thereof will be omitted. Further, since the RSSI measuring unit 217 is the same configuration as the RSSI measuring unit 114 of the monitoring unit 110 of FIG. 2, a duplicated description will be omitted.

The control unit 214 controls an operation of each component of the first repeater 210 based on the data received through the RF transceiving unit 211 or the LF receiving unit 122. In detail, the destination ID is changed according to a request from the monitoring unit 110 or the tractor repeater 120. Further, whether the tire mounted on the first trailer 200 is abnormal is determined based on a result of comparing sensed data transmitted from the second sensor unit 220 and predetermined data (reference value). For example, when the pressure of the tire is less than predetermined reference pressure or the temperature of the tire is equal to or higher than a reference temperature, the message regarding the low-pressure alarm or the high-pressure alarm is transmitted to the monitoring unit 110. In this case, when the sensed data received through the RF transceiving unit 211 does not include the sensor ID prestored in the first repeater 210, whether the tire is abnormal is not determined.

The memory unit 216 stores the destination ID secured by the monitoring unit 110 and sensor IDs corresponding to the positions of the respective tires mounted on the first trailer 200.

Figure 5:
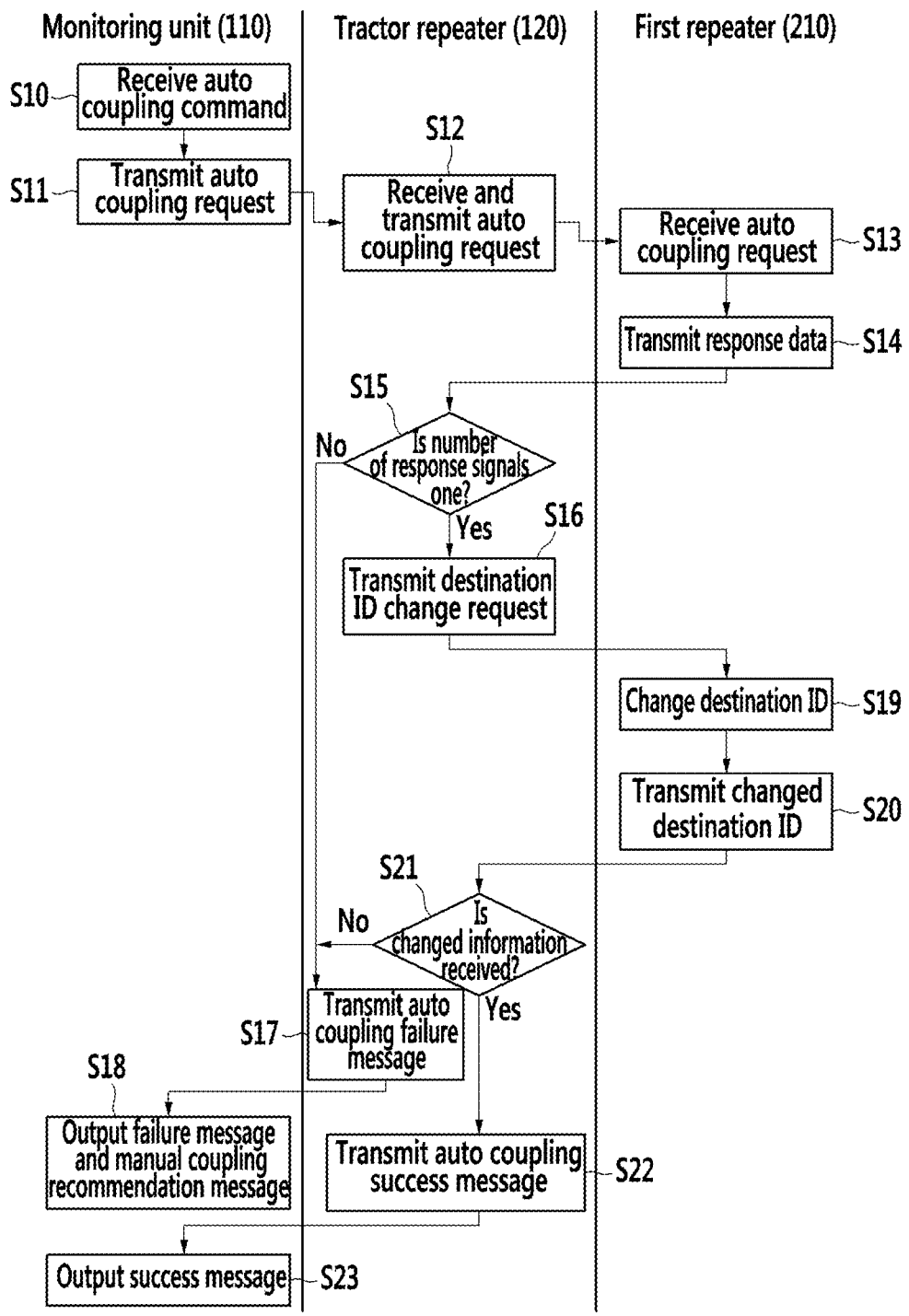
FIG. 5 illustrates an auto coupling method of the monitoring unit using the tractor repeater and the first repeater according to an exemplary embodiment of the present invention.

FIG. 5 illustrates an auto coupling method of the monitoring unit using the tractor repeater and the first repeater according to an exemplary embodiment of the present invention.

First, when the auto coupling command is received through the user interface unit (S10), the auto coupling request is transmitted to the tractor repeater 120 through the RF transceiving unit 111.

The tractor repeater 120 transmits the auto coupling request to the first repeater 210 when receiving the auto coupling request transmitted in step S1 through the RF transceiving unit 121 (S12).

When the first repeater 210 receives the auto coupling request transmitted in step S12 through the RF transceiving unit 211 (S13), the first repeater 210 transmits response data to the tractor repeater 120 (S14). In this case, the response data is an ID of the first repeater 210.

The tractor repeater 120 receives the response data transmitted in step S14 through the RF transceiving unit 121 and calculates the number of received repeater IDs (S15).

According to a result of the calculation in step S15, when the number of repeater IDs is one, a destination ID change request is transmitted to the first repeater 210 through the RF transceiving unit 121. When one or more repeater IDs are received or no repeater ID is received, an auto coupling failure message is transmitted to the monitoring unit 110 through the RF transceiving unit 121 (S17).

The monitoring unit 110 outputs a manual coupling recommendation message together with the failure message through the display unit 116 when receiving the auto coupling failure message transmitted in step S17 (S18).

The first repeater 210 changes a destination ID through the control unit 214 when receiving the destination ID change request through step S16 (S19), and transmits a changed destination ID to the tractor repeater 120 through the RF transceiving unit 211 (S20).

The tractor repeater 120 determines whether to receive destination ID change information transmitted in step S20 through the RF transceiving unit 121 (S21).

When the destination ID change information is received in step S21, an auto coupling success message is transmitted to the monitoring unit 110 through the RF transceiving unit 121 (S22), and when the destination ID change information is not received, the auto coupling failure message is transmitted to the monitoring unit 110 through the RF transceiving unit 121 (S17).

The monitoring unit 11 outputs the auto coupling success message through the display unit 116 when the auto coupling success message is transmitted through step S22 (S23), and outputs the manual coupling recommendation message together with the auto coupling failure message through the display unit 116 when the auto coupling failure message is transmitted through step S17 (S18).

Figure 6:
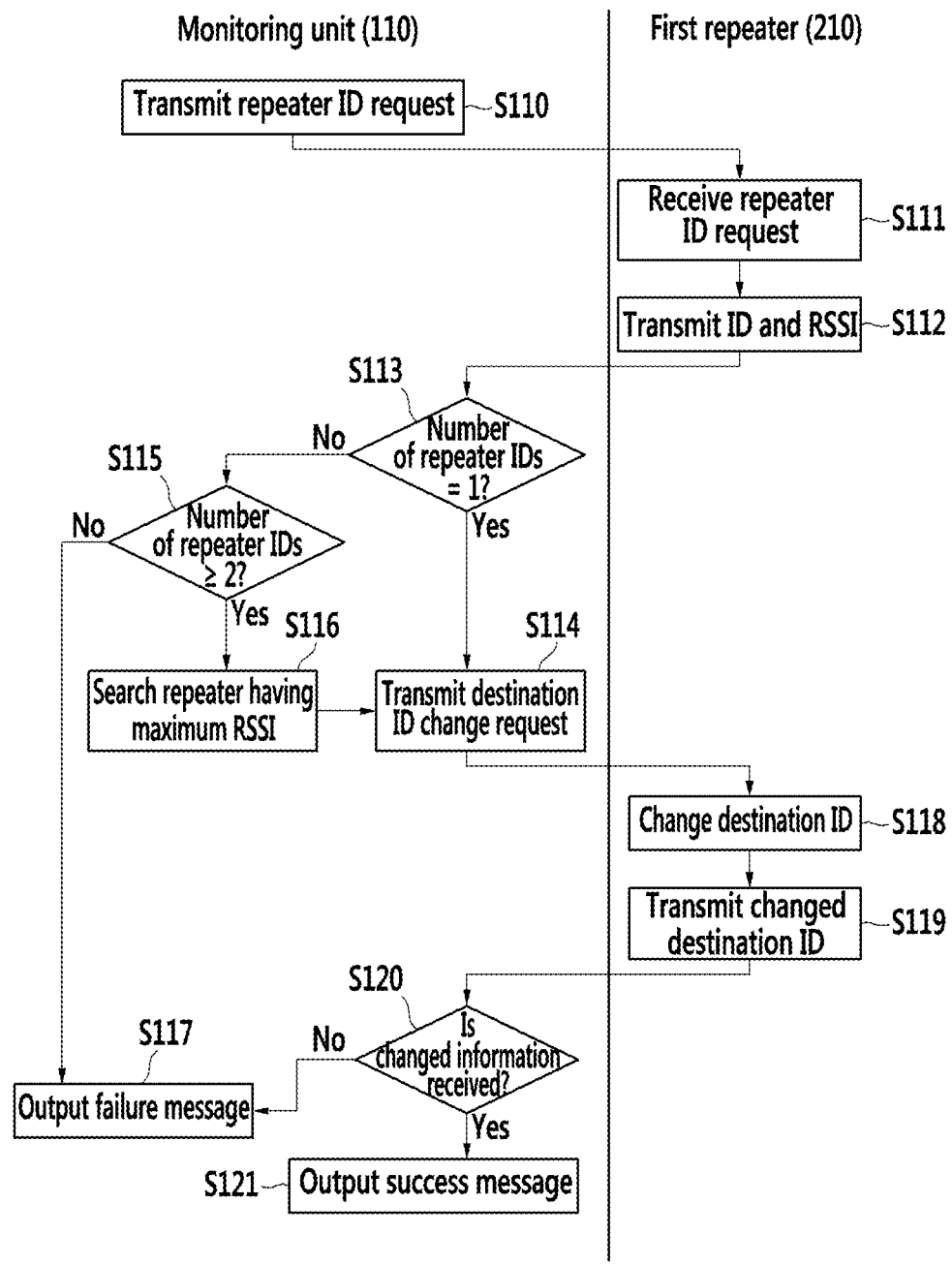
FIG. 6 illustrates a manual coupling method of the monitoring unit and the first repeater according to an exemplary embodiment of the present invention.

FIG. 6 illustrates a manual coupling method of the monitoring unit and the first repeater according to an exemplary embodiment of the present invention.

Manual coupling of FIG. 6 is performed when auto coupling of the monitoring unit 110 and the first repeater 210 using the tractor repeater 120 has failed in FIG. 5 or when the monitoring unit 110 and the second repeater 310 are intended to be connected to each other. Hereinafter, a method of manually connecting the monitoring unit 110 and the first repeater 210 by assuming that the auto coupling has failed in FIG. 5 will be described in detail.

First, the monitoring unit 110 transmits the repeater ID request to the first repeater 210 through the low power RF transmitting unit 112 (S110).

The first repeater 210 receives the repeater ID request transmitted in step S110 through the RF transceiving unit 211 (S111), and transmits the repeater ID and the received signal strength indicator (RSSI) (S112).

The monitoring unit 110 receives the repeater ID and the RSSI transmitted in step S112 through the RF transceiving unit 111, and calculates the number of repeater IDs (S113).

According to a result of the calculation in step S113, when the number of repeater IDs is one, the destination ID change request is transmitted to the corresponding repeater ID, for example, the first repeater 210, through the RF transceiving unit 111 (S114).

When the number of repeater IDs is one, it is calculated whether the number of IDs is two or more (S115), and according to a result of the calculation in step S115, when the number of IDs is two or more, a repeater having the maximum RSSI value is searched through the control unit 115 (S116) and the destination ID change request is transmitted to the searched first repeater 210 (S114). In this case, the repeater searching method in step S116 will be described below.

(1) Searching the repeater having the maximum RSSI value measured through the RSSI measuring unit 114

(2) Searching a repeater having a maximum value among RSSI values transmitted together with the repeater IDs from a plurality of repeaters (3) Searching a repeater having the maximum RSSI value when the maximum RSSI value measured through the RSSI measuring unit 114 coincides with the maximum RSSI values transmitted from the plurality of repeaters When the number of repeater IDs is not two or more according to the result of the calculation in step S115, the failure message is output through the display unit 116 (S117).

The first repeater 210 changes the destination ID through the control unit 214 when receiving the destination ID change request through step S114 (S118), and transmits the changed destination ID to the monitoring unit 110 through the RF transceiving unit 211 (S119).

The monitoring unit 110 determines whether to receive the destination ID change information transmitted in step S119 through the RF transceiving unit 111 (S120).

According to a result of the determination in step S120, the success message is output through the display unit 116 when the destination ID change information is received (S121), and the failure message is output when the destination ID change information is not received (S117).

Figure 7:
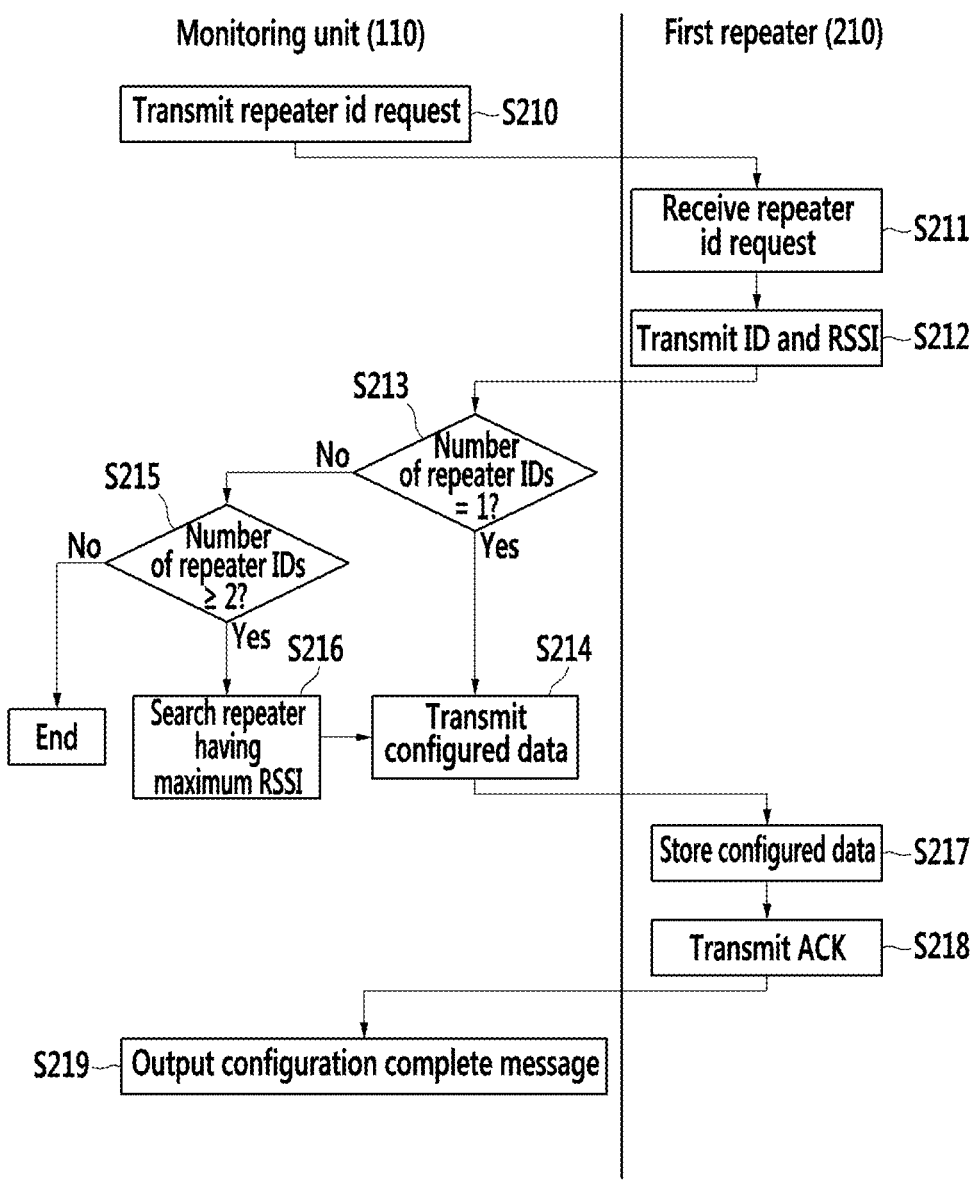
FIG. 7 illustrates a configured data transmitting method of the first repeater according to an exemplary embodiment of the present invention.

FIG. 7 illustrates a configured data transmitting method of the first repeater according to an exemplary embodiment of the present invention.

First, the monitoring unit 110 transmits the repeater ID request to the first repeater 210 through the LF transmitting unit 113 or the low power RF transmitting unit 112 (S210).

The first repeater 210 receives the repeater ID request transmitted in step S110 through the RF transceiving unit 211 (S211), and transmits the repeater ID and the received signal strength indicator (RSSI) value (S212).

The monitoring unit 110 receives the repeater ID and the RSSI value transmitted in step S212 through the RF transceiving unit 111, and calculates the number of repeater IDs (S213).

According to a result of the calculation in step S213, when the number of repeater IDs transmitted in step S212 is one, the configured data is transmitted to the corresponding repeater ID, for example, the first repeater 210, through the RF transceiving unit 111 (S214). In this case, the configured data includes at least one of a vehicle type, a repeater type, a prescribed air pressure, a prescribed temperature, an alarm level, or a management target sensor ID.

When the number of repeater IDs transmitted in step S212 is not one according to a result of the calculation in step S213, it is determined whether the number of repeater IDs is two or more (S215), and when the number of repeater IDs is two or more, the repeater having the maximum RSSI value is searched (S216). Since the repeater searching step of S216 is the same as step S116 of FIG. 6, a duplicated description thereof will be omitted.

According to a result of the determination in step S215, when the number of repeater IDs is not two or more, transmitting of the configured data of the first repeater 210 ends.

The first repeater 210 stores the configured data transmitted in step S214 through the control unit 214 (S217), and when storing the respective configured data is completed, completed data is transmitted to the monitoring unit 110 through the RF transceiving unit 211 (S218).

The monitoring unit 110 outputs a configuration complete message through the display unit 116 when the completed data transmitted through step S218 is received (S219).

When the monitoring unit 110 and the first repeater 210 are automatically or manually connected with each other through FIG. 5 or 6, and the configured data is transmitted through FIG. 7, the first repeater 210 determines whether a problem occurs in the tire mounted on the first trailer 200 to transmit related information. For example, information including the position (alternatively, the number) of the tire in which the problem occurs and a problem item (e.g., low pressure or high temperature) may be transmitted.

Figure 8:
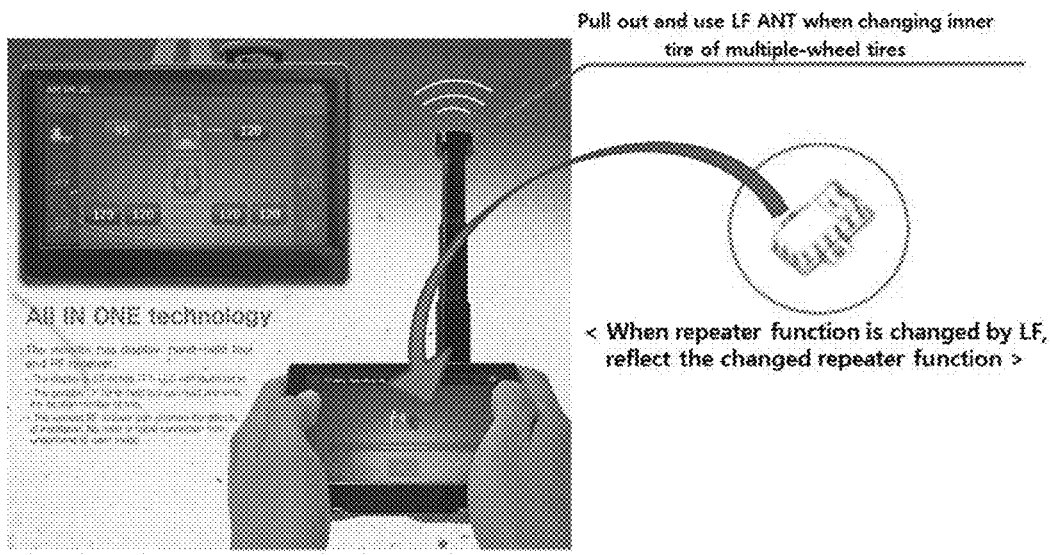
FIG. 8 illustrates an example of a monitoring unit according to an exemplary embodiment of the present invention.

FIG. 8 illustrates an example of a monitoring unit according to an exemplary embodiment of the present invention.

FIG. 8 illustrates a hardware component of the monitoring unit 110, and when connection and configuration of an inner tire among multiple-wheel tires are performed, the length of a low-frequency antenna is extended to transfer a sensor ID or repeater ID request signal.

According to one exemplary embodiment of the present invention, a tire pressure monitoring system uses a radio frequency band or a low power radio frequency band to decrease a time required for registering the position of a tire as compared with a method using a low-frequency band in the related art.

According to one exemplary embodiment of the present invention, the tire pressure monitoring system requests a repeater ID of a trailer through a low-frequency band or the low-power radio frequency band and transmits a destination ID change request through the radio frequency band to change a destination ID of a trailer repeater, thereby preventing interference and crosstalk due to a signal generated from a peripheral repeater and decreasing a data transmission time.

According to one exemplary embodiment of the present invention, set data depending on weather, a road condition, a trailer loading freight, or a driver's operating habit is transmitted by connecting a monitoring unit of a tractor and the repeater of the trailer through wireless communication to improve tire monitoring efficiency of the tractor and trailer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: Tractor
110: Monitoring unit
111: RF transceiving unit
112: Low power RF transceiving unit
113: LF transmitting unit
114: RSSI measuring unit
115: Control unit
116: Display unit
120: Tractor repeater
121: RF transceiving unit
122: LF receiving unit
123: Wired communication unit
124: Control unit
125: Power supply unit
126: Memory unit
130, 220, 320: Sensor unit

The invention claimed is:

1. A tire pressure monitoring system comprising: a monitoring unit positioned in a tractor, a first repeater positioned in the tractor, a plurality of second repeaters positioned in a plurality of trailers connected to the tractor, and a plurality of sensors positioned at tires of the tractor or the trailers, wherein the monitoring unit includes a first RF transceiving unit transmitting an auto coupling request, a destination identification (ID) change request, and configured data and receiving a first received signal strength indicator (RSSI), a repeater identification (ID), a sensor identification (ID), and sensed data with the first repeater, the plurality of second repeaters, or the plurality of sensors through a radio frequency band, a low power RF transmitting unit transmitting a repeater ID request to the plurality of second repeaters through a low power radio frequency band, an LF transmitting unit transmitting data to the plurality of second repeaters through a low frequency band, a first control unit sensing abnormal data receiving in the first RF transceiving unit, and a display unit outputting connection information for the second repeater received through the first RF transceiving unit, wherein transmitting and receiving power of the first RF transceiving unit is higher than transmitting power of the low power RF transmitting unit, in the case where the second repeater having the maximum value of a first received signal strength indicator (RSSI) values measured through the plurality of second repeaters and the second repeater having the maximum value of a second RSSI values measured through the monitoring unit coincide with each other, the destination ID change request is transmitted to the corresponding second repeater.

2. The apparatus of claim 1, wherein
the first repeater includes
a second RF transceiving unit transceiving data with the monitoring unit, the plurality of second repeaters, or the plurality of sensors through the radio frequency band,
a first LF receiving unit receiving the data transmitted through the low frequency band, and
a second control unit sensing whether the second RF transceiving unit or the LF receiving unit abnormally receives the data and determining whether the tires mounted on the tractor are abnormal.

3. The apparatus of claim 2, wherein
the plurality of second repeaters include
a third RF transceiving unit transceiving data with the monitoring unit, the first repeater, or the plurality of sensors through the radio frequency band,
a second LF receiving unit receiving the data transmitted through the low frequency band, and
a third control unit determining whether the tires of the trailer are abnormal.

4. The apparatus of claim 3, wherein
the first RF transceiving unit transmits an auto coupling request to the first repeater based on a coupling command input from a user,
the second RF transceiving unit receives the auto coupling request transmitted from the first RF transceiving unit and transmits the auto coupling request to the plurality of second repeaters, and the third RF transceiving unit receives the auto coupling request transmitted from the second RF transceiving unit and transmits a repeater ID to the first repeater.

5. The apparatus of claim 4, wherein
when the repeater ID is received through the second RF transceiving unit, a destination ID change request is transmitted to a second repeater corresponding to the received repeater ID among the plurality of second repeaters.

6. The apparatus of claim 3, wherein
the low power RF transmitting unit or the LF transmitting unit transmits a repeater ID request to the plurality of second repeaters, and
the third RF transceiving unit receives the repeater ID request to measure the first RSSI value and transmits the repeater ID and the measured first RSSI value to the monitoring unit.

7. The apparatus of claim 6, wherein
the monitoring unit further includes
an RSSI measuring unit measuring second RSSI values of the plurality of second repeaters.

8. The apparatus of claim 6, wherein
the monitoring unit further includes
an RSSI measuring unit measuring the second RSSI values of the plurality of second repeaters.

9. The apparatus of claim 1, wherein the monitoring unit is portable separately from the tractor.

10. A tire pressure alarm method in a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, the method comprising:
transmitting a repeater ID request to the plurality of second repeaters with first power through a first radio frequency band;
receiving the repeater ID corresponding to the repeater ID request from the plurality of second repeaters with second power through a second radio frequency band;
transmitting a destination ID change request to a second repeater corresponding to the received repeater ID among the plurality of second repeaters through the second radio frequency band; and
receiving destination ID change information corresponding to the destination ID change request from one second repeater through the second radio frequency band and transmitting a success message to the monitoring unit,
wherein the first radio frequency band is lower than the second radio frequency band or the first power is lower than the second power,
in the case where the second repeater having the maximum value of a first RSSI values measured through the plurality of second repeaters and the second repeater having the maximum value of a second RSSI values measured through the monitoring unit coincide with each other, the destination ID change request is transmitted to the corresponding second repeater.

11. The method of claim 10, wherein
when the number of the received repeater IDs is plural,
in the transmitting of the destination ID change request,
in the case where the second repeater having the maximum value of the first RSSI values measured through the plurality of second repeaters and the second repeater having the maximum value of the second RSSI values measured through the monitoring unit coincide with each other, the destination ID change request is transmitted to the corresponding second repeater.

12. A tire pressure alarm method in a tire pressure monitoring system including a monitoring unit positioned in a tractor, a first repeater positioned in the tractor, a plurality of second repeaters positioned in a plurality of trailers connected to the tractor, and a plurality of sensors positioned at tires of the tractor or the trailers, the method comprising:
transmitting a repeater ID request to the plurality of second repeaters with first power through a first radio frequency band or a low frequency band;
receiving the repeater ID corresponding to the repeater ID request from the plurality of second repeaters with second power through a second radio frequency band; and
transmitting configured data to a second repeater corresponding to the received repeater ID among the plurality of second repeaters through the second radio frequency band,
wherein the first power is lower than the second power,
in the case where the second repeater having the maximum value of a first RSSI values measured through the plurality of second repeaters and the second repeater having the maximum value of a second RSSI values measured through the monitoring unit coincide with each other, the destination ID change request is transmitted to the corresponding second repeater.

13. The method of claim 12, wherein
when the number of the received repeater IDs is plural,
in the transmitting of the configured data,
in the case where the second repeater having the maximum value of the first RSSI values measured through the plurality of second repeaters and the second repeater having the maximum value of the second RSSI values measured through the monitoring unit coincide with each other, the configured data is transmitted to the corresponding second repeater.

14. The method of claim 12, wherein
the configured data includes at least one of the tractor type, the trailer type, the first repeater or second repeater type, a prescribed air pressure, a prescribed temperature, an alarm level, and a management target sensor ID.

* * * * *